United States Patent [19]

Blanchard et al.

[11] Patent Number: 6,085,386
[45] Date of Patent: Jul. 11, 2000

[54] HINGE FOR A SEAT IN PARTICULAR FOR AN AUTOMOBILE VEHICLE AND SEAT PROVIDED WITH SAID HINGE

[75] Inventors: Jean-Marie Blanchard; Olivier Delatte; Michel Diluccio; Philippe Guillenard; Sylvain Rager, all of Nogent sur Vernisson, France

[73] Assignee: Cesa—Compagnie Europeenne de Sieges pour Automobiles, Levaloois-Perret, France

[21] Appl. No.: 09/076,764

[22] Filed: May 13, 1998

[30] Foreign Application Priority Data

May 15, 1997 [FR] France .................................. 97 06000

[51] Int. Cl.[7] .................................................... E05D 11/10
[52] U.S. Cl. ............................ 16/325; 297/373; 297/367
[58] Field of Search ............................. 16/324, 325, 333, 16/334, 336; 297/373, 366, 367, 378.14, 378.12, 378.1

[56] References Cited

U.S. PATENT DOCUMENTS

| 4,082,352 | 4/1978 | Bales et al. ............................. 297/367 |
| 4,223,927 | 9/1980 | Cremer ................................... 297/367 |
| 4,348,050 | 9/1982 | Letournoux et al. ................... 297/367 |
| 4,997,223 | 3/1991 | Croft ..................................... 297/367 |
| 5,590,931 | 1/1997 | Fourrey et al. ........................ 297/367 |
| 5,632,525 | 5/1997 | Uramichi ............................... 297/367 |
| 5,718,483 | 2/1998 | Yamaguchi et al. ................... 297/367 |
| 5,820,219 | 10/1998 | Rohee .................................. 297/367 |
| 5,857,746 | 1/1999 | Barrere et al. ........................ 297/367 |

FOREIGN PATENT DOCUMENTS

| 741056 | 11/1996 | European Pat. Off. . |
| 773132 | 11/1996 | European Pat. Off. . |
| 2722150 | 7/1994 | France . |
| 2739812 | 10/1995 | France . |

Primary Examiner—Chuck Y. Mah
Attorney, Agent, or Firm—Sughrue, Mion, Zinn, Macpeak & Seas, PLLC

[57] ABSTRACT

The hinge includes two flanges (24, 26) adapted to be fixed to a seat cushion and a seat squab (backrest), respectively. The flanges (24, 26) can turn relative to each other about a hinge axis (X) that is substantially perpendicular to them. The hinge additionally includes a hinge control member (32) mounted to rotate about the hinge axis (X) at least one way from a rest position and means for spring loading the control member into its rest position including approximate positioning means (76) and accurate positioning means (82) for the control member (32). The accurate positioning means preferably include at least one U-shape spring (82) in axial bearing engagement between the edge of a recess (88) of a bearing (P1) supporting the control member (32) and a positioning flat (90) of the control member (32).

11 Claims, 6 Drawing Sheets

ND OF THE INVENTION

The present invention concerns an improved hinge for a seat, in particular for an automobile vehicle, and a seat provided with said hinge.

One prior art hinge for a seat, in particular for an automobile vehicle, is of the type comprising:

two connecting flanges, one of which is fixed and is adapted to be fixed to a seat cushion and the other which is mobile and is adapted to be fixed to a seat squab or backrest, said flanges being adapted to turn relative to each other about a hinge axis that is substantially perpendicular to them, a hinge control member mounted to rotate about the hinge axis at least one way from a rest position, and means for spring loading the control member into its rest position including means for approximate positioning of said control member.

FR-A-2 739 812 (FR-95 12 159), corresponding to U.S. Pat. No. 5,857,746 describes a hinge of this type including means for coupling the flanges together actuated by two rotary rings each having a lug on its inside contour. The control member has a cam between the two lugs. The spring loading means urge the control member towards its approximate rest position by virtue of cooperation of the two lugs and the cam on the control member. This approximate position is acceptable in that there is an angular clearance between the lugs and the cam on the control member on each side of the cam.

However, in some cases this angular clearance can give rise to unwanted vibration of the control member and imprecise positioning of the manoeuvring handle usually attached to the control member.

SUMMARY OF THE INVENTION

The aim of the invention is to refine the approximate rest position of the control member imposed by the spring loading means.

To this end, the invention consists in a hinge for a seat, in particular for an automobile vehicle, of the aforementioned type, characterised in that the spring loading means also include means for accurate positioning of the control member separate from the approximate positioning means adapted to refine the approximate rest position of the control member.

In accordance with other features of said hinge:

the control member has a generally cylindrical shape and is carried by at least one bearing in the fixed flange and the accurate positioning means comprise at least one thrust spring bearing radially between the fixed flange and a flat for positioning the control member so as to spring load the flat into a position coinciding with the accurate rest position of the control member;

the thrust spring is a generally U shape leaf spring having two plane branches in radial bearing engagement, a fixed branch against an edge of a recess in the contour of the bearing and a mobile branch against the positioning flat, the thrust spring spring loading the flat into a position substantially parallel to that of its branches;

the flat is delimited by a substantially concave surface so as to limit contact of the mobile branch with the flat substantially to two generatrices of the control member;

the free end of the mobile branch has two attachment lugs disposed between one face of the fixed flange and a shoulder on the control member, the attachment lugs extending transversely to the control member, on respective opposite sides of said member;

the attachment lugs are housed in a recess on the face of the fixed flange compensating the thickness of the lugs;

the hinge further includes means for coupling the flanges together actuated by two rotary rings centred substantially on the hinge axis, each comprising a lug on their inside contour, the control member being provided with a cam disposed between the two lugs, adapted to cooperate selectively with said two lugs by rotating in opposite directions, the approximate positioning means for the control member including a circumferentially acting spring hooked onto the lugs, so as to spring load the rings in opposite directions tending to place the control member in its rest position by cooperation of the two lugs with the cam of the control member;

the spring is a split ring the axial edges of which are hooked into the lugs;

the rings can be moved in two opposite directions respectively to adjust the inclination of the squab and to fold it forwards, between a first position of attaching at least one coupling member respectively to the first and second flanges and a second position releasing said member;

the coupling member is a lever which can turn about a bearing point which, when said lever is attached to a flange, is fixed relative to that flange.

The invention also consists in a seat for an automobile vehicle having at least one hinge as defined hereinabove.

The invention will be better understood after reading the following description given by way of example only and with reference to the drawings, in which:

DESCRIPTION OF THE PREFERRED EMBODIMENTS

Figure 1:
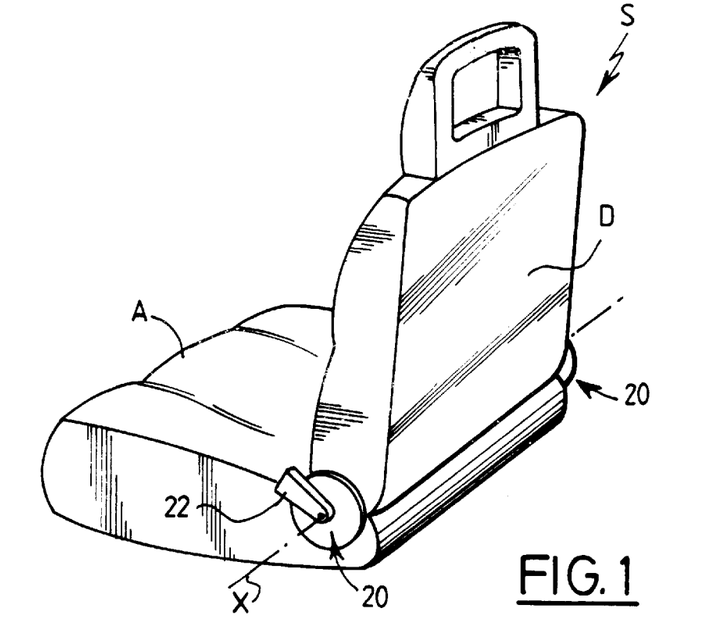
FIG. 1 is a diagrammatic perspective view of a seat for an automobile vehicle provided with at least one hinge in accordance with the invention.

FIG. 1 shows a seat S for an automobile vehicle including a squab D connected to a cushion A by two hinges 20 in accordance with the invention.

The hinges 20 are of the same type as that described in FR-A-2 722 150 (FR-94 08 297), corresponding to U.S. Pat.

No. 5,590,931 which concern a so-called "memory" type hinge. This type of hinge allows the seat squab to be folded forward onto the seat cushion, for example to obtain access to the space behind the seat, and to raise the seat squab to the operative position, without modifying the adjustment of the seat squab inclination.

Each hinge 20 is a mirror image of the other hinge.

The hinges 20 are preferably controlled by a handle 22 common to both hinges.

Figure 2:
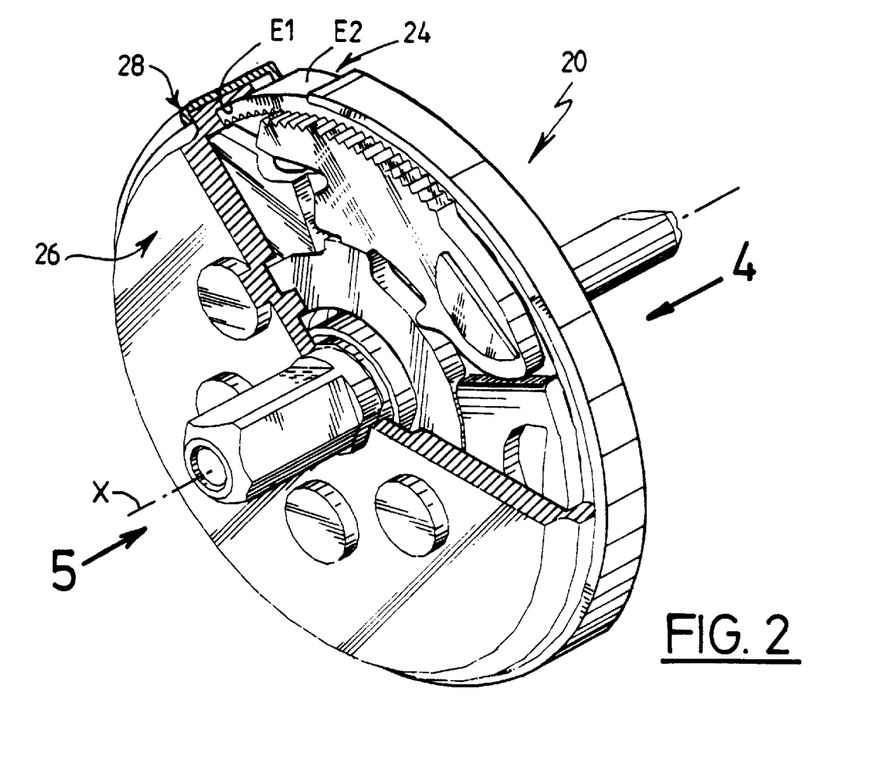
FIG. 2 is a perspective view of said hinge.
Figure 3:
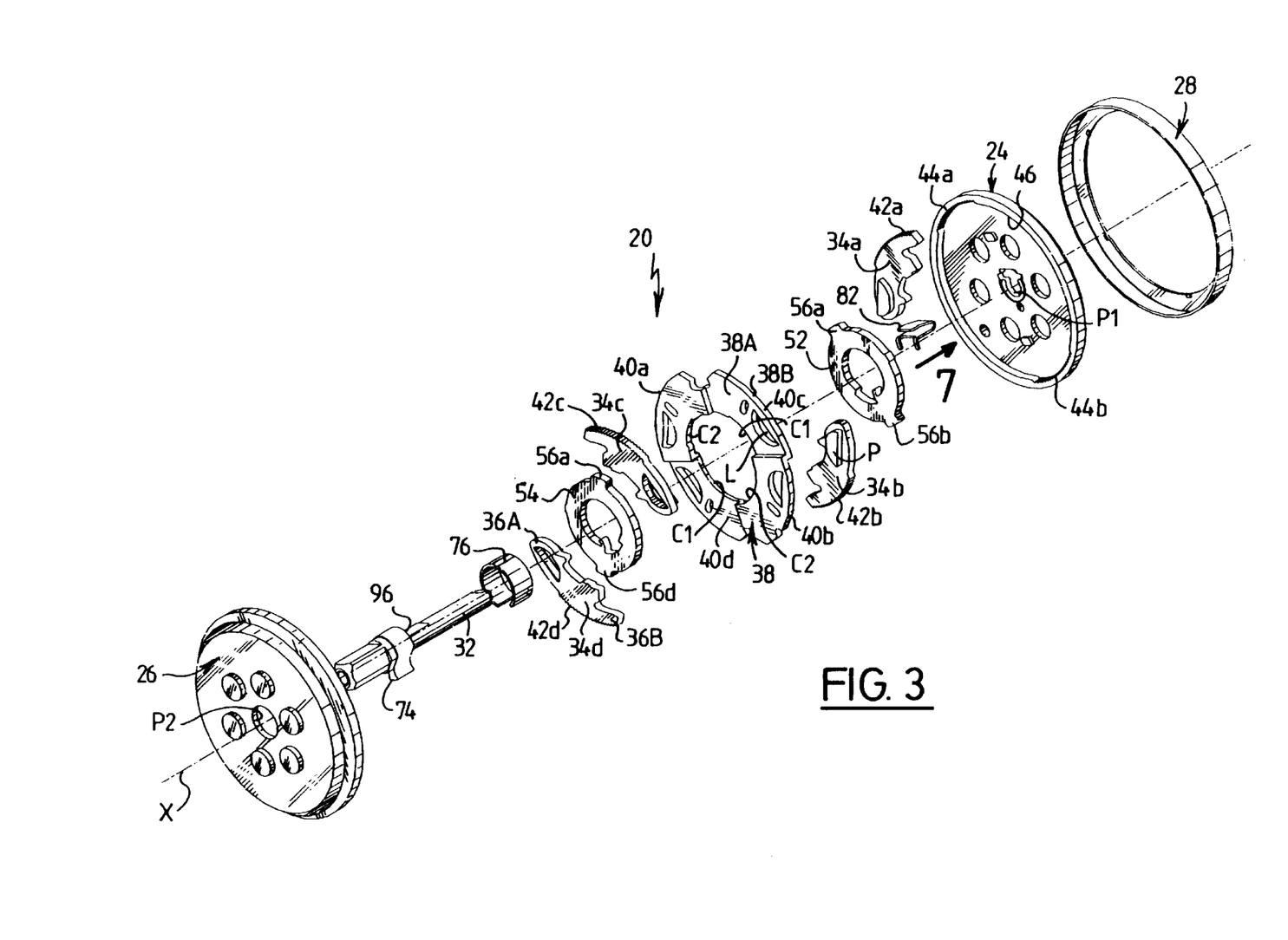
FIG. 3 is an exploded view of the hinge shown in FIG. 2.

Refer to FIGS. 2 and 3 in particular, which show a hinge 20 in more detail; the latter includes two generally circular connecting flanges 24, 26, one of which is a fixed flange fixed to the cushion A and the other of which is a mobile flange fixed to the squab or backrest D.

The connecting flanges 24, 26 are mounted to rotate relative to each other about a hinge axis X that is substantially perpendicular to them and are held against each other in a manner that is known in itself by means of a connecting ring 28.

The connecting flanges 24, 26 are centred relative to each other by complementary peripheral shoulders E1, E2 coaxial with the hinge axis X.

The connecting flanges 24, 26 delimit a housing between them for means 30 for coupling the flanges. The means 30 are controlled by a generally circular cylindrical member 32 to which the handle 22 is fixed in a manner known in itself.

The control member 32 is mounted to rotate about the hinge axis X in two bearings P1, P2 formed in the connecting flanges 24, 26.

The control member 32 can be moved by means of the handle 22 in two opposite directions from a rest position, namely a clockwise direction to adjust the inclination of the squab relative to the cushion and an anticlockwise direction to fold the squab forward.

The control members 32 of the two hinges 20 are linked together by a conventional coupling device.

The coupling means comprise four generally circuate levers 34a through 34d which are preferably identical and extend substantially parallel to the connecting flanges 24, 26.

A first end 36A of the coupling levers 34a through 34d is mounted to pivot on a generally circular support flange 38 housed between the connecting flanges 24, 26 so that it can turn relative to the latter about the hinge axis X. The connecting flanges 24, 26 and the support flange 38 are substantially parallel to each other.

The second end 36B of the levers 34a through 34d is adapted to be attached to a corresponding connecting flange by virtue of cooperation of complementary shapes which, when interengaged with each other, define an attachment area of the coupling lever.

Each coupling lever 34a through 34b is therefore able to move about its pivot axis between a position in which its second end 36B is attached to a corresponding connecting flange 34a through 34b and a position in which said second end 36B is released.

The coupling levers 34a through 34d are associated in pairs with the connecting flanges 24, 26. The two levers of the same pair are substantially symmetrical about the hinge axis X and are hinged to the same face 38A, 38B of the support-flange so that the four levers 34a through 34d alternate on the two faces 38A, 38D of the support-flange. The levers 34a through 34d are hinged to sectors 40a through 40d of the support-flange offset alternately parallel to the hinge axis X.

Note that the support-flange 38 can be attached to the seat cushion and/or to the seat squab by coupling with one or both of the connecting flanges 24, 26 by means of the levers 34a through 34d.

The complementary shapes procuring the attachment are preferably delimited by complementary teeth. Accordingly, the second end 36B of the coupling levers 34a through 34d includes a toothed sector 42a through 42d.

Figure 4:
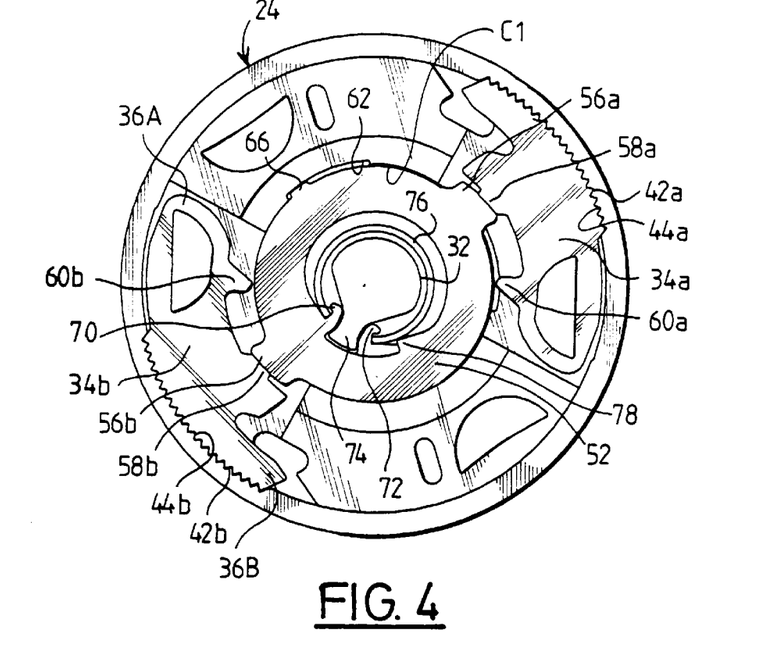
FIGS. 4 and 5 are front views of the hinge shown in FIG. 2, respectively in the direction of the arrows 4 and 5, with the connecting flange partly cut away where pointed to by the arrows 4 and 5 to expose the interior of the hinge, the coupling levers being in the position attached to the connecting flanges.

The toothed sectors 42a, 42b of the pair of coupling levers 34a, 34b associated with the fixed flange 24 are adapted to cooperate with toothed sectors 44a, 44b subtending the same angle on the inside contour of a peripheral shoulder 46 of the fixed flange 24 which can be seen in FIGS. 3 and 4 in particular.

Figure 5:
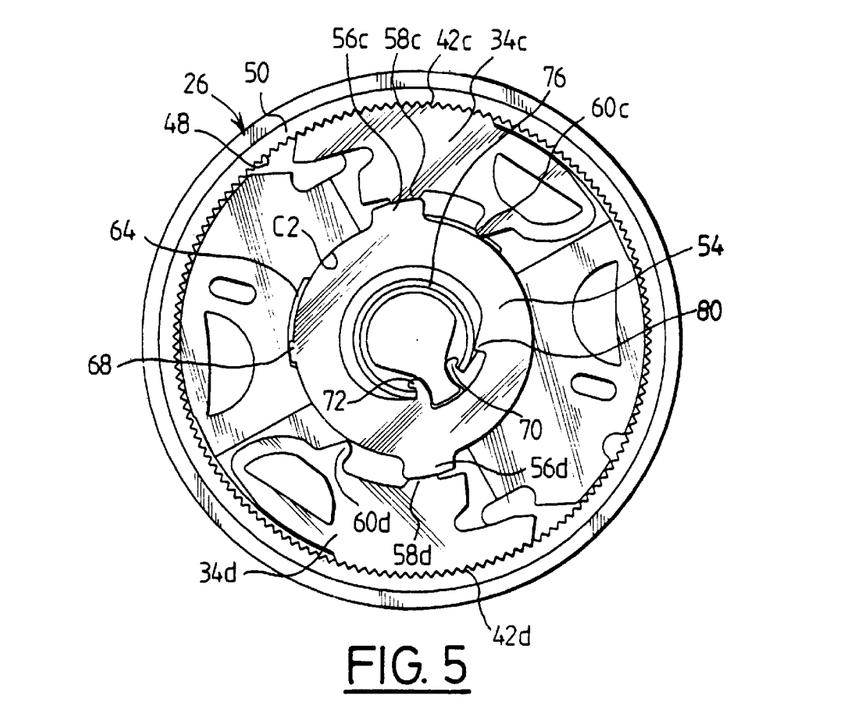

The toothed sectors 42c, 42d of the pair of coupling levers 34c, 34d associated with the mobile flange 26 are adapted to cooperate with a toothed sector 48 subtending a greater angle on the inside contour of a peripheral shoulder 50 of the mobile flange 26 which can be seen in FIG. 5 in particular. The toothed sector 48 preferably extends all around the circumference of the shoulder 50 so as to form a toothed ring.

The first end 36A of the coupling levers 34a through 34b carries a pivot P formed, for example, by a half-cut-out in this end 36A, mounted to pivot in a pivot slot L in the corresponding sector 40a through 40d of the support-flange 38. The pin P and the slot L define a pivot axis of the coupling lever substantially parallel to the rotation axis X.

The pivot P and the pivot slot L are generally half-moon shape, for example, the slot L extending over a wider sector than the pivot P.

Note that each coupling lever 34a through 34d can turn about a bearing point (the pivot slot L of the lever) which, when the lever is attached to a connecting flange 24, 26, is fixed relative to that flange.

The control member 32 operates means for manoeuvring the coupling levers 34a through 34d. These means are used to place the levers in a rest configuration, as shown in FIGS. 4 and 5, in which the two connecting flanges 24, 26 are coupled together, and in two alternative active configurations, one of which is shown in FIG. 6, in which the two connecting flanges 24, 26 are decoupled.

The normal operation of a memory type hinge as shown in the figures, for adjusting the inclination and folding forward the seat squab, is conventional. It is described, for example, in FR-A-2 720 250 (FR-94 08 297) in which the latches 53 and the dowels 43 are analogous to the levers 34a through 34d described hereinabove.

In the rest configuration the coupling levers 34a through 34d are all attached to the connecting flanges 24, 26 to couple the latter and to immobilise the squab relative to the cushion.

Figure 6:
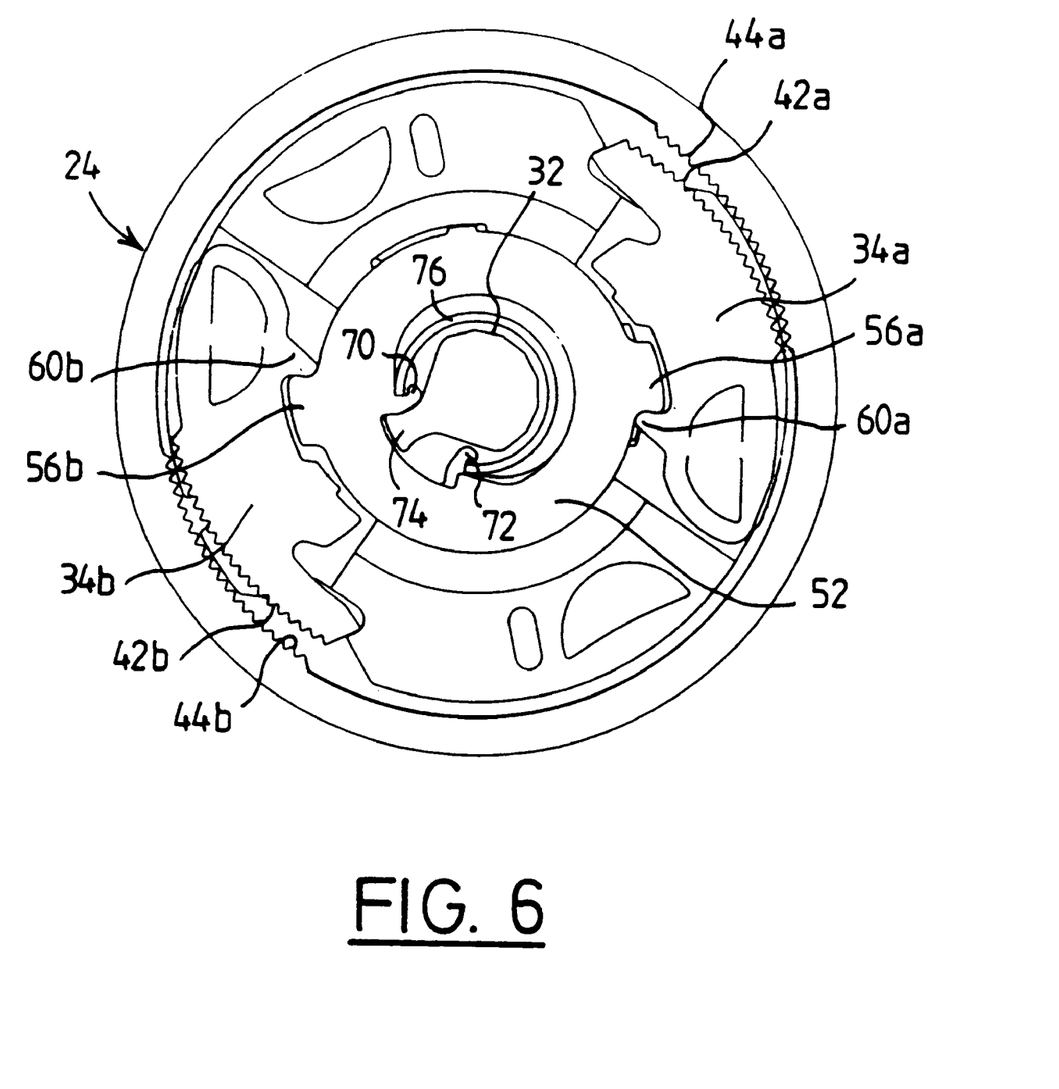
FIG. 6 is a view similar to FIG. 4 in which the coupling levers are in the position released from the corresponding connecting flange.

In the two alternative active configurations, only one of the pairs of coupling levers 34a through 34d is attached to the corresponding connecting flange 24, 26 to allow, alternately, adjustment of the inclination of the squab or, as shown in FIG. 6, temporary folding forward of the squab.

The manoeuvring means comprise two rotary rings 52, 54 centred on the hinge axis X, for example by means of two pairs of circular arcs C1, C2 delimiting a central opening in the support-flange 38 cooperating with the outside contours of the rings. The centring arcs C1, C2 of the same pair delimit two diametrically opposed sectors 40c, 40d, 40a, 40b of the support-flange 38.

The rings 52, 54 can be moved in two opposite directions to adjust the inclination and to fold forward the squab, respectively. To this end, each ring 52, 54 is associated with a pair of coupling levers 34a through 34d so as to be movable between a first position in which the levers of that pair are attached to the corresponding connecting flange 24, 26 and a second position in which the levers are released.

Referring to FIGS. 4 through 6 in particular, it can be seen that each ring 52, 54 comprises a pair of diametrally opposed manoeuvring cams 56a through 56d delimited by bosses on the outside contour of the ring.

When a ring 52, 54 is in its first attachment position, as shown in FIGS. 4 and 5, each manoeuvring cam 56a through 56d cooperates with a wedging cam 58a through 58d delimited by a boss on the inside contour of a corresponding coupling lever 34a through 34d near the second end 36B of that lever.

When a ring 52, 54 is in its second, released position, as shown in FIG. 6 (in the case of the ring 52), each manoeuvring cam 56a through 56d cooperates with a pivot cam 60a through 60d delimited by a boss on the inside contour of a corresponding coupling lever 34a through 34d near the first end 36A of that lever.

Note that angular displacement of each ring 52, 54 is limited by the angular dimension of a recess 62, 64 in a corresponding centring arc C1, C2 into which extends a tab 66, 68 attached to the outside contour of the ring 52, 54.

Each of the rings 52, 54 comprises a displacement lug 70, 72 on its inside contour.

The control member 32 has a cam 74 for moving the rings 52, 54 between the two lugs 70, 72. The cam 74 cooperates selectively with the two lugs 70, 72, which therefore constitute displacement cams, by rotation in opposite directions, respectively for adjusting the inclination of the squab and folding it forward.

When the manoeuvring means are in the rest configuration, the control member 32 is in the rest position as shown in FIGS. 4 and 5, towards which it is spring-loaded by means described below.

The spring loading means comprise means for approximately positioning the control member.

These approximate positioning means include a circumferentially acting spring 76 hooked onto the lugs 70, 72 so as to spring load the rings 52, 54 in opposite directions, towards their attached position, i.e. their position in which the manoeuvring cams 56a through 56d cooperate with the wedging cams 58a through 58c.

Accordingly, the spring 76 spring loads the control member 32 into an approximate rest position by cooperation of the two lugs 70, 72 with the displacement cam 74 of the control member.

The spring 76 is a split ring, for example, the axial edges of which are hooked into the lugs 70, 72.

Each ring 52, 54 preferably includes a boss 78, 80 on its inside contour, on the other side its lug 70, 72 relative to the drive cam 74 of the control member, so as to contribute to positioning and centring the circumferentially acting spring 76.

Figure 7:
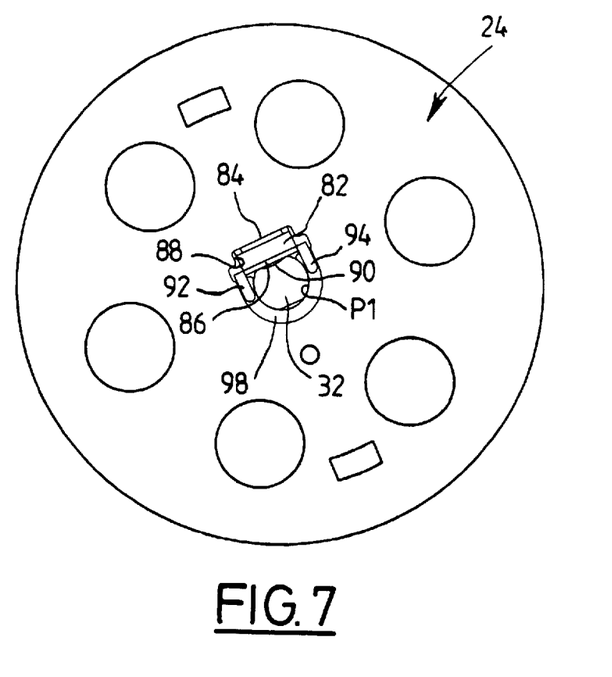
FIGS. 7 and 8 are views in the direction of the arrow 7 in FIG. 3 showing a control member of the hinge in respective different positions.
Figure 8:
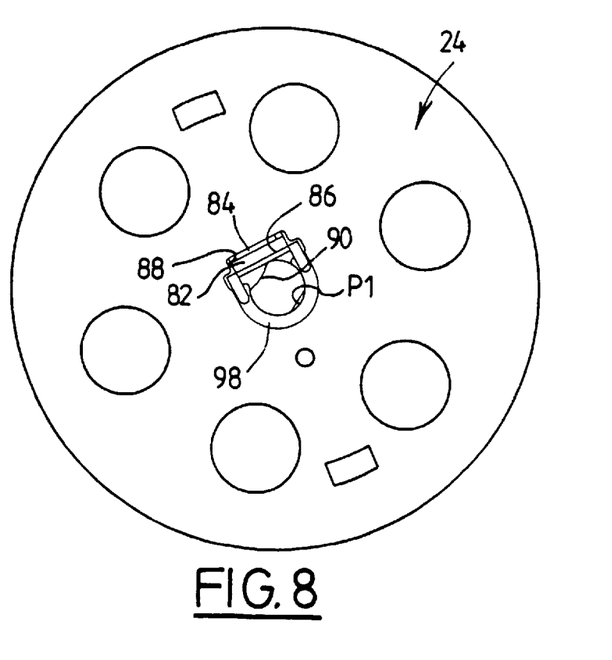

The spring loading means also comprise means for accurate positioning of the control member 32 to refine the approximate rest position of the member 32, these means being shown in FIGS. 3, 7 and 8.

These accurate positioning means comprise at least one thrust spring 82 in the form of U-shape leaf springs having two plane branches 84, 86 extending substantially longitudinally parallel to the hinge axis X.

A fixed first branch 84 bears radially against the fixed flange 24, more particularly against the edge of a recess 88 in the contour of the bearing P1.

The mobile second branch 86 bears radially against a positioning flat 90 on the control member 32.

The thrust spring 82 spring loads the flat 90 into a position substantially parallel to that of its branches 84, 86 coinciding with the accurate rest position of the control member 32.

The flat 90 is preferably delimited by a substantially concave surface to limit the contact of the mobile branch 86 with the flat 90 substantially to two generatrices of the control member 32.

The free end of the mobile branch 86 includes two attachment lugs 92, 94 substantially perpendicular to the hinge axis X. The lugs 92, 94 are adapted to immobilise the thrust spring 82 in the axial direction and to this end they are disposed between the inside face of the fixed flange 24 and a shoulder 96 on the control member which can be seen in FIG. 3.

The attachment lugs 92, 94 extend transversely to the control member 32, on respective opposite sides of the latter, and are preferably housed in a recess 98 in the inside face of the fixed flange 24 to accommodate the thickness of the lugs.

Alternatively, the hinge can include two thrust springs 82 cooperating with two diametrally opposed flats 90 in the fixed flange 24.

Of course, other forms of thrust spring are feasible for placing it in radial bearing engagement between the edge of the recess 88 and the positioning flat 90 such that the latter is spring loaded into a position coinciding with the accurate rest position of the control member.

The operation of the means for spring loading the control member 32 is clear from the description of them given hereinabove.

In particular, note that when the control member 32 is turned from its rest position towards an active position to move one of the rings 52, 54, as shown in FIG. 6, the circumferentially acting spring 76 is deformed in a manner that increases its diameter. One axial edge of the spring 76 bears on the lug 70, 72 of the ring 52, 54 that remains fixed, so reinforcing the attachment to the corresponding connecting flange of the coupling levers associated with that ring.

Likewise, when the control member 32 is turned one way or the other from its rest position the thrust spring 82 deforms elastically, its branches 84, 86 moving towards each other, to enable rotation of the control member 32 in the bearing P1, as shown in FIG. 8.

The hinge 20 also includes means for immobilising the second end 36B of the coupling levers 34a through 34d in the connected position.

The immobilising means are activated only if, when the connecting flanges 24, 26 and the support-flange 38 are coupled together, i.e. when the control member 32 is in the rest position, the flanges 24, 26, 38 are subjected to a torque tending to uncouple them accidentally.

Figure 9:
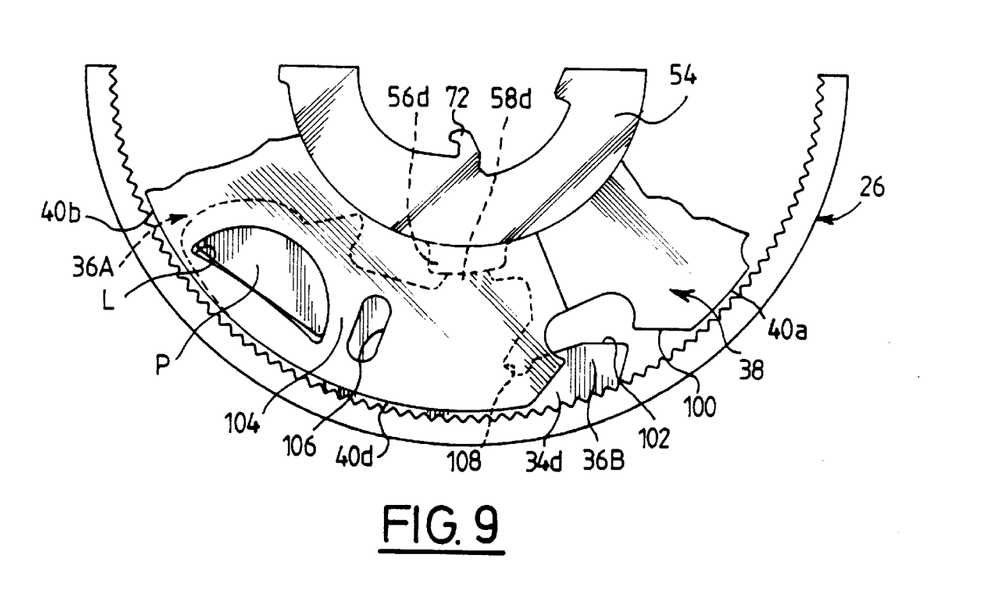
FIGS. 9 and 10 are half-views similar to FIG. 5, to a larger scale, respectively showing the hinge before and after it has been subjected to an accidental torque.
Figure 10:
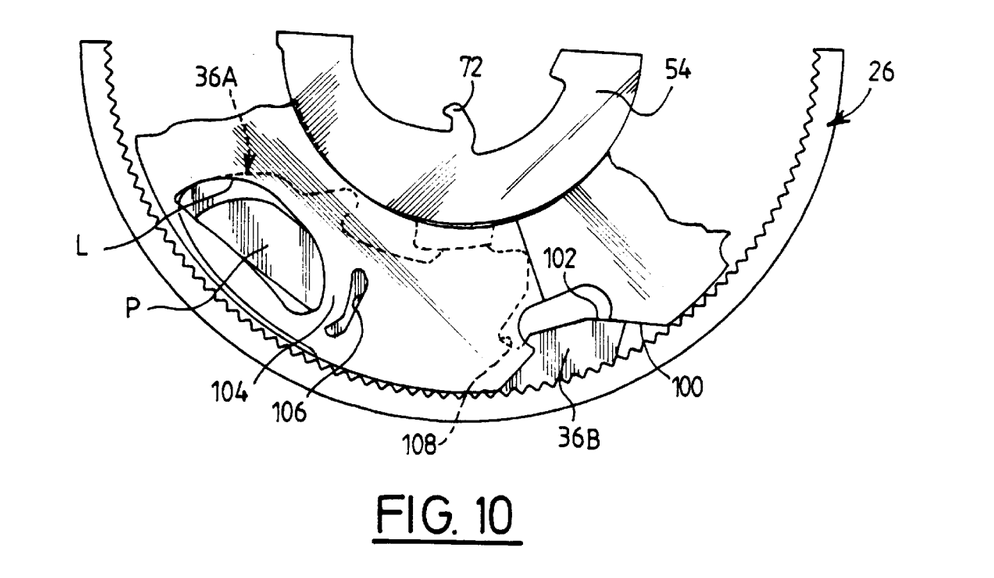

Referring to FIGS. 9 and 10 in particular, it can be seen that the immobilising means for each coupling lever 34a through 34d comprise two complementary immobilising means 100, 102 respectively on the support-flange 38 and on the second end 36B of the coupling lever and a weakened area of the support-flange 38.

Each immobilising ramp 100 carried by the support-flange 38 is on a sector 40a through 40d of the support-flange adjacent a sector 40a through 40d to which the lever 34a through 34d is hinged, carrying the complementary immobilising ramp 102.

When a coupling lever 34a through 34d is in the attached position, the corresponding immobilising ramps 100, 102 are separated, as shown in FIGS. 4, 5 and 9.

The weakened area of the support-flange 38, associated with a corresponding coupling lever 34a through 34d, preferably includes a portion 104 of the support-flange 38 extending between the pivot slot L and a weakening slot 106 in the support-flange 38 near the pivot slot L and between the latter and the immobilising ramp 100 carried by the support-flange 38.

The weakening slot 106 can have various shapes, for example an oblong shape (as shown in FIG. 9 in particular) or a circular shape.

The weakened area of the support-flange associated with each coupling lever 34a through 34d deforms if the hinge flanges are subjected to an accidental torque to allow the coupling lever to move relative to the support-flange 38 until the immobilising ramps 100, 102 come into contact, as shown in FIG. 10. The ramps 100, 102 then cooperate to immobilise the second end 36B of the coupling lever in the attached position in which the teeth on that lever are interengaged with those of the corresponding connecting flange.

The curved inside contour of the coupling levers 34a through 34d preferably includes a notch 108 for weakening the levers such that, if the hinge flanges are subjected to an accidental torque, these levers can be deformed by alteration of their curvature. This alteration of their curvature facilitates cooperation of the immobilising ramps 100, 102.

The hinge 20 is particularly well suited to resisting a torque exerted accidentally when the connecting flanges 24, 26 are coupled together.

If the accidental torque is applied in the direction wedging the manoeuvring cams 56a through 56d with the wedging cams 58a through 58d, the attachment of the coupling levers 34a through 34d to the corresponding connecting flanges 24, 26 is reinforced, which prevents accidental separation of the connecting flanges.

If the accidental torque is applied in opposition to the wedging effect between the manoeuvring cams 56a through 56d and the wedging cams 58a through 58d (i.e. if the accidental torque is applied in a direction moving the pivot axis of the coupling levers 34a through 34d away from the attachment area of those levers), this torque deforms the weakened areas of the support flange 38 to cause the immobilising ramps 100, 102 to cooperate and to reinforce the attachment of the coupling levers 34a through 34d to the corresponding connecting flanges 24, 26.

Accordingly, regardless of the direction of the accidental torque, there is no risk of the connecting flanges 24, 26 separating.

The invention is not limited to the embodiment shown in the figures.

In particular, the hinge 20 in accordance with the invention is not necessarily a memory type hinge and can, for example, provide only the squab inclination adjustment function, without the folding function. In this case, the support-flange comprises the fixed connecting flange, the hinge including only one pair of coupling levers, or even only one coupling lever.

What is claimed is:

1. A hinge for a seat, in particular for an automobile vehicle, comprising:
    two connecting flanges (24, 26), one of which is fixed and is adapted to be fixed to a seat cushion (A) and the other of which is mobile and is adapted to be fixed to a seat squab (D), said flanges (24, 26) being adapted to turn relative to each other about a hinge axis (X) that is substantially perpendicular to them,
    a hinge control member (32) mounted to rotate about the hinge axis (X) at least one way from a rest position, and
    means for spring loading the control member (32) toward said rest position, including means (76), coupled to the control member, for approximate positioning of said control member (32) in an approximate rest position,
    wherein the spring loading means also include means (82) for accurate positioning of the control member (32), coupled to said control member and separate from the approximate positioning means (76), to refine the approximate rest position of the control member (32) into an accurate rest position.

2. The hinge according to claim 1, wherein the control member (32) has a generally cylindrical shape and is carried by at least one bearing (P1) in the fixed flange (24) and wherein the accurate positioning means comprise at least one thrust spring (82) bearing radially between the fixed flange (24) and a positioning flat surface (90) of the control member for positioning the control member (32) so as to spring load the flat surface (90) into a position coinciding with the accurate rest position of the control member.

3. The hinge according to claim 2, wherein the thrust spring (82) is a generally U shape leaf spring having two plane branches (84, 86) in radial bearing engagement, a fixed branch bearing against an edge of a recess (88) in a contour of the bearing (P1) and a mobile branch bearing against the positioning flat surface (90), the thrust spring (82) spring loading the flat surface (90) to be substantially parallel to said branches (84, 86).

4. The hinge according to claim 3, wherein the flat surface (90) is delimited by a substantially concave surface so as to limit engagement of the mobile branch (86) with the flat surface (90) substantially to two generatrices of the control member (32).

5. The hinge according to claim 3, wherein a free end of the mobile branch (86) has two attachment lugs (92, 94) disposed between one face of the fixed flange (24) and a shoulder (96) on the control member (32), the attachment lugs (92, 94) extending transversely to the control member (32), on respective opposite sides of said control member (32).

6. The hinge according to claim 5, wherein the attachment lugs (92, 94) are housed in another recess (98) on the face of the fixed flange (24) to accommodate the thickness of the lugs.

7. The hinge according to claim 1, including further means for coupling the flanges (24, 26) together actuated by two rotary rings (52, 54) centred substantially on the hinge axis (X), each comprising a lug (70, 72) on their inside contour, the control member being provided with a cam (74) disposed between the two lugs (70, 72) and adapted to cooperate selectively with said two lugs (70, 72) by rotating in opposite directions, the approximate positioning means including a circumferentially acting spring (76) hooked onto the lugs (70, 72), so as to spring load the rings in opposite directions tending to place the control member (32) in its rest position by cooperation of the two lugs (70, 72) with the cam (74) of the control member (32).

8. A hinge according to claim 7, wherein the spring (76) is a split ring the axial edges of which are hooked into the lugs (70, 72).

9. The hinge according to claim 7, wherein the rings (52, 54) are movable in two opposite directions respectively to adjust the inclination of the squab and to fold it forwards, between a first position of attaching at least one coupling member (34*a*–34*d*) respectively to the first and second flanges (24, 26) and a second position releasing said coupling member (34*a*–34*d*).

10. A hinge according to claim 9, wherein the coupling member is a lever (34*a*–34*d*) which can turn about a bearing point (L) which, when said lever is attached to a flange (24, 26), is fixed relative to that flange (24, 26).

11. A seat for an automobile vehicle comprising at least one hinge (20) according to claim 1.

* * * * *